(12) United States Patent
Guerriero

(10) Patent No.: US 7,479,235 B2
(45) Date of Patent: Jan. 20, 2009

(54) METHOD FOR ETCHING A WORKPIECE

(75) Inventor: Simone Guerriero, San Jose, CA (US)

(73) Assignee: Ahead Magnetics, Inc., San Jose, CA (US)

( * ) Notice: Subject to any disclaimer, the term of this patent is extended or adjusted under 35 U.S.C. 154(b) by 379 days.

(21) Appl. No.: 11/388,031

(22) Filed: Mar. 23, 2006

(65) Prior Publication Data

US 2007/0187357 A1  Aug. 16, 2007

Related U.S. Application Data

(60) Provisional application No. 60/773,225, filed on Feb. 13, 2006.

(51) Int. Cl.
*C23F 1/00* (2006.01)
(52) U.S. Cl. .............................. 216/51; 216/67; 216/77
(58) Field of Classification Search .................. None
See application file for complete search history.

(56) References Cited

U.S. PATENT DOCUMENTS

| | | | | |
|---|---|---|---|---|
| 5,764,454 A * | 6/1998 | Hishida | ................ | 360/125.53 |
| 5,862,022 A * | 1/1999 | Noguchi et al. | .......... | 360/324.2 |
| 6,001,268 A | 12/1999 | Nguyen et al. | ................ | 216/67 |
| 6,027,660 A * | 2/2000 | Hsiao et al. | .................... | 216/22 |
| 6,051,099 A * | 4/2000 | Bus-Kwoffie et al. | .. | 156/345.37 |
| 6,154,346 A * | 11/2000 | Sasaki | ........................ | 360/317 |
| 6,296,776 B1 * | 10/2001 | Sasaki | ......................... | 216/22 |
| 6,340,558 B1 | 1/2002 | Kubota et al. | ............... | 430/320 |
| 6,452,756 B1 * | 9/2002 | Sasaki | ........................ | 360/317 |
| 6,589,436 B1 * | 7/2003 | Tabib et al. | .................... | 216/52 |
| 6,627,096 B2 | 9/2003 | Sherrer et al. | ................. | 216/24 |
| 6,671,135 B2 * | 12/2003 | Sasaki et al. | ................. | 360/317 |
| 6,712,984 B2 * | 3/2004 | Sasaki | ......................... | 216/22 |
| 6,906,895 B2 * | 6/2005 | Hirooka | .................... | 360/234.3 |
| 7,187,523 B2 * | 3/2007 | Hirooka | .................... | 360/234.3 |
| 2002/0093762 A1 | 7/2002 | Hsiao et al. | ................. | 360/126 |
| 2003/0003714 A1 | 1/2003 | Lee et al. | ..................... | 438/636 |
| 2003/0193743 A1 * | 10/2003 | Sasaki et al. | ................. | 360/126 |
| 2004/0057153 A1 * | 3/2004 | Hirooka | ....................... | 360/125 |
| 2005/0109729 A1 * | 5/2005 | Hirooka | ....................... | 216/20 |
| 2006/0126224 A1 * | 6/2006 | Sakamoto et al. | ........... | 360/128 |
| 2007/0187357 A1 * | 8/2007 | Guerriero | ..................... | 216/41 |

OTHER PUBLICATIONS

S.V. Nguyen et al., "The Role of Inert Gases in Reactive Ion Etching of $Al_2O_3$-TiC (N58) Mixed Phases for Slider Air Bearing Surface Patterning", Electrochem. Soc. Proc. vol. 98-20, pp. 115-123 (1998).
Fukushima et al., "New Reactive Ion Etching Process for HDD Slider Fabrication", IEEE Trans. Mag. vol. 32, No. 5, Sep. 1996, pp. 3786-3788.
Fukushima et al., "High-Rate and Smooth Surface Etching of $Al_2O_3$-TiC Employing Inductively Coupled Plasma (ICP)", Jpn. J. Appl. Phys. vol. 32, 1996, pp. 2312-2315.
11 pages Dialog Printout dated Jan. 17, 2006.

* cited by examiner

*Primary Examiner*—Allan Olsen

(57) ABSTRACT

A method for etching an AlTiC workpiece comprises forming a copper mask layer on the AlTiC, lithographically patterning said copper mask layer to thereby expose portions of the AlTiC, reactive ion etching the AlTiC using a process gas comprising argon and fluorine, and removing the mask layer. The walls of the portions of the AlTiC covered by the copper mask layer are vertical, even when etching is to a substantial depth.

7 Claims, 2 Drawing Sheets

METHOD FOR ETCHING A WORKPIECE

This application claims priority based on my Provisional Patent Application Ser. No. 60/773,225, filed Feb. 13, 2006, incorporated herein by reference.

BACKGROUND OF THE INVENTION

This invention pertains to methods for etching a workpiece. This invention also pertains to reactive ion etching.

Burnishing heads are typically used to burnish magnetic disks and/or disk substrates. Such heads are typically made of $Al_2O_3$—TiC (also known in the industry as AlTiC). The burnishing surfaces of burnishing heads are machined to leave a set of burnishing structures thereon to facilitate burnishing. The shape and profile of those structures are designed to optimize performance.

Although it is possible to make burnishing heads with some types of burnishing structures using a machining process, machining is difficult or impractical for other structure shapes. Accordingly, I have investigated forming a burnishing surface by selectively etching burnishing head substrate material using a RIE (reactive ion etching) process.

In one burnishing head design, it was discovered that the structures on the burnishing surface should be fairly tall (e.g. about 65 μm tall) and have substantially vertical walls. This is very difficult to achieve with a RIE process.

U.S. Pat. No. 6,296,776, issued to Sasaki, discusses using reactive ion etching to etch AlTiC. However, Sasaki does not achieve vertical walls when etching AlTiC.

U.S. Pat. No. 6,001,268, issued to Nguyen, discusses patterning a slider comprising alumina and TiC. Nguyen etches to shallow depths, e.g. on the order of 5 μm. See also Nguyen et al., "The Role of Inert Gases in Reactive Ion Etching of $Al_2O_3$—TiC (N58) Mixed Phases for Slider Air Bearing Surface Patterning", ElectroChemical Society Proceedings Vol. 98-20 (1998).

Fukushima et al., "High-Rate and Smooth Surface Etching of $Al_2O_3$—TiC Employing Inductively Coupled Plasma (IPC)", Jpn. J. Appl. Phys., Vol. 33 (1996), also discusses shallow etching of discusses etching $Al_2O_3$—TiC (e.g. 5.5 μm). See also Fukushima et al., "New Reactive Ion Etching for HDD Slider Fabrication", IEEE Trans. Mag. Vol. 32, No. 5 (September, 1996)

SUMMARY

I have discovered a method for reactive ion etching AlTiC to substantial depths (greater than 30 μm, and generally on the order of 65 μm) and simultaneously achieving essentially vertical walls. In one embodiment, this is accomplished by:
a) depositing a copper mask layer on the AlTiC;
b) patterning the copper mask layer (e.g. using lithographic techniques) to thereby expose portions of the AlTiC; and
c) reactive ion etching the exposed AlTiC using a process gas comprising a mixture of fluorine and argon.

The fluorine is typically introduced into the RIE chamber in the form of a compound such as $SF_6$, although other fluorine-containing compounds such as $CF_4$ or $CHF_3$ could be used.

I have found that the ability to achieve deep vertical walls while etching AlTiC depends on a) using copper as a mask material; and b) providing a process gas mixture comprising an appropriate ratio of fluorine and argon. The ratio of argon to $SF_6$ is typically between 1:1 and 1:2. In one embodiment, I introduce about 20 SCCM of $SF_6$ and 15 SCCM of argon into the RIE chamber. I am able to achieve a selectivity ratio of 50:1 between the etching rates of copper and AlTiC.

AlTiC comprises two phases: an $Al_2O_3$ phase and a TiC phase. While not being bound by theory, it is believed that during reactive ion etching in the presence of the above-described gas mixture, the following occurs:

1. Exposed copper forms an intermediate product, presumably $Cu_2F_2$, at the copper mask layer surface. This product impedes the etching of copper. Without a sufficient amount of fluorine, the copper would be etched rapidly by argon ions, and the etching selectivity would be greatly impaired.
2. The $Cu_2F_2$ is bombarded by argon and removed during the process, thereby exposing copper thereunder. However, as soon this copper is exposed, it reacts with fluorine to form additional $Cu_2F_2$.
3. During reactive ion etching, the aluminum in the AlTiC reacts with fluorine to form $AlF_3$. The $AlF_3$ is non-volatile (i.e. not gaseous), and thus the argon is needed to physically remove the $AlF_3$.
4. The titanium reacts with fluorine to form TiF, which is volatile (gaseous), and therefore simply removed from the RIE chamber.
5. The carbon reacts with fluorine to form different carbon-fluorine compounds, some of which are volatile, and therefore simply removed from the RIE chamber, and some of which are solid and form on the AlTiC.
6. Polymers form on the sidewalls of the AlTiC being etched. This passivates the sidewalls and enhances their vertical nature.
7. If there is too much fluorine in the RIE process chamber, the TiC phase of the AlTiC is preferentially etched. Because the byproducts of the reaction are mainly gaseous (volatile), etch pockets form in the AlTiC, increasing roughness (which is undesirable).
8. Because the mask layer (copper) and the AlTiC are electrically conductive, the amount of ion and electron scattering is minimized.
9. If one tried to selectively etch AlTiC with a thick resist mask (e.g. 300 μm) in the context of a deep RIE process (instead of using a copper mask), the mask would tend to slump and the lines would be poorly defined, Also, the copper does not striate during etching. This also enhances line definition.

As mentioned above, the etch depth is typically greater than 30 μm. In one embodiment between about 65 and 100 μm and the wall angle is typically from 75 to 82°. For shallow etching depths (e.g. less than 65 μm), the wall angle is greater than 85° and less than 88°.

The figures are not to scale.

DETAILED DESCRIPTION

Figure 1:
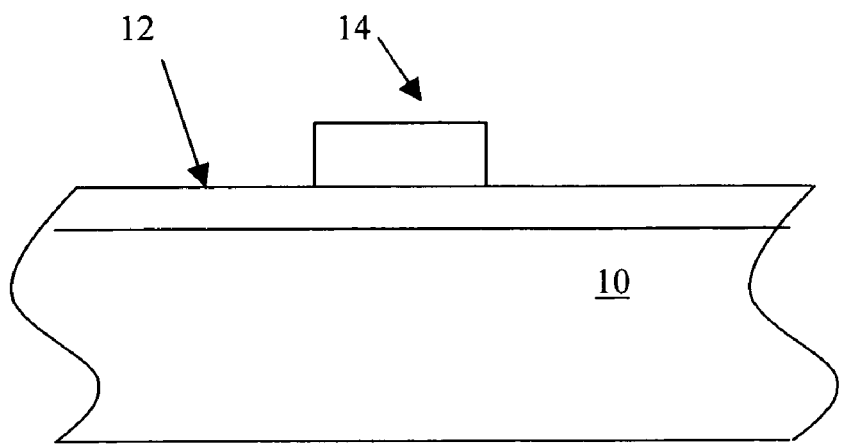
FIG. 1 illustrates an AlTiC workpiece covered with a copper hard mask layer and a photoresist layer.

A method in accordance with my invention begins by coating an AlTiC substrate 10 with a Cu hard mask layer 12 and a photoresist layer 14 (FIG. 1). Substrate 10 is typically about 34 mils thick, whereas hard mask layer 12 is about 4.5 to 5 μm thick. In one embodiment, mask layer 12 is formed by sputtering. Also, in one embodiment, photoresist layer 14 is configuration 2.1 or 1.8, manufactured by Rohm Haas (previously Shipley), and is applied by being spun onto layer 12. Photoresist layer 14 is then baked and exposed to thereby form a pattern therein. (It should be noted that FIG. 1 illustrates only a small portion of substrate 10 in cross section. Typically, numerous regions of the substrate are processed simultaneously using the method described herein. These other regions are not shown in the figures for ease of illustration.)

Figure 2:
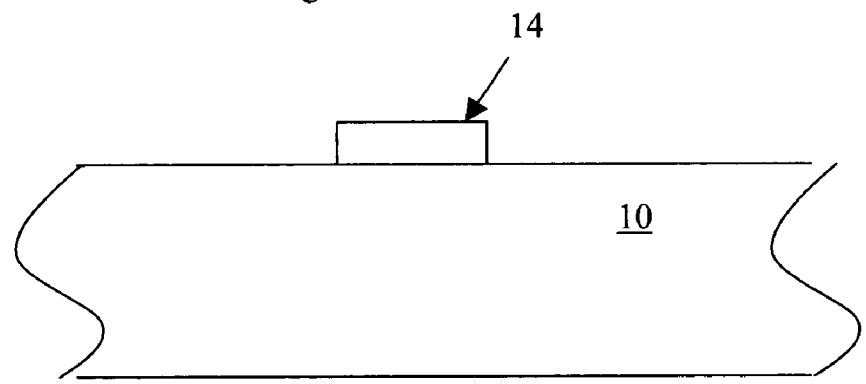
FIG. 2 illustrates the structure of FIG. 1 after the photoresist and the copper hard mask layer have been patterned.

Referring to FIG. 2, the exposed portions of mask layer 12 are etched using an aqueous ferric chloride ($FeCl_3$) solution to thereby transfer the pattern in resist layer 14 to mask layer 12. Of importance, copper is much more selectively attacked by $FeCl_3$ than the photoresist. Because of the difference in color between copper and AlTiC, it is easy to see whether the patterning of mask layer 12 is complete. After etching, the remaining portions of resist layer 14 are removed with acetone.

Figure 3:
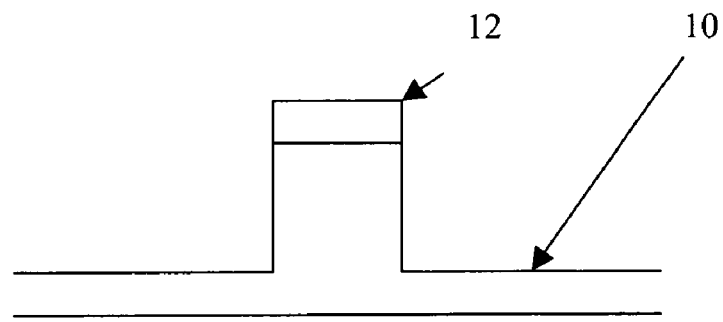
FIG. 3 illustrates the structure of FIG. 2 after the photoresist has been removed and the AlTiC workpiece has been subjected to reactive ion etching.

Referring to FIG. 3, the exposed portions of substrate 10 are etched using reactive ion etching. During this process, 20 SCCM $SF_6$ and 15 SCCM of argon flow into the etching apparatus. The pressure in the chamber is about 7 millitorr, and the power applied to the chamber is about 980 W at a frequency of 13.56 MHz. The etching apparatus can be a Plasma Therm RIE system with a standard parallel plate configuration. The electrode can be circular, with an 11" diameter. (The power density in such an embodiment is about 10 W/in$^2$, but in other embodiments, the power density can be between 8 and 14 W/in$^2$.)

The etching can last between about 31 and 34 hours, thereby resulting in an etching depth of about 65 μm, with features having vertical walls.

Figure 4:
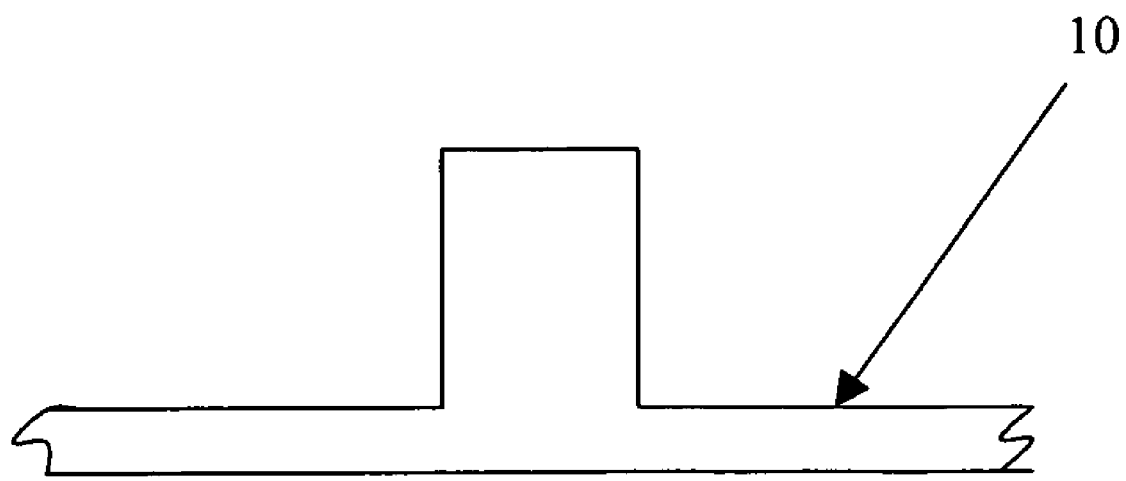
FIG. 4 illustrates the structure of FIG. 3 after the copper hard mask layer has been removed.

Referring to FIG. 4, after etching, copper mask layer 12 is removed, e.g. by dipping substrate 10 in an aqueous $FeCl_3$ solution. Substrate 10 is then cut into individual die for further processing. (In one embodiment, these die are formed into burnishing heads. Such heads may eventually have a structure as shown in U.S. Provisional Patent Application Ser. No. 60/773,190, entitled "Burnishing Head", filed by Singh et al. on Feb. 13, 2006, incorporated herein by reference.)

As mentioned above, the process of the present invention provides tall structures in the AlTiC surface having very vertical walls. This process can be used without having to rely on toxic and dangerous chemicals.

While the invention has been described with respect to a specific embodiment, those skilled in the art will recognize that changes can be made in form and detail without departing from the spirit and scope of the invention. For example, the process of the present invention can be used to form structures other than burnishing heads. Merely by way of example, AlTiC is used to form other types of heads in the disk industry, e.g. read-write heads. The process can also be used to make structures other than heads.

Layer 14 can be patterned using visible light or other types of light (e.g. ultraviolet light or X-rays). Layer 14 can be either positive or negative resist. In addition, layer 14 can be patterned in other ways, e.g. e-beam patterning.

In some embodiments, instead of (or in addition to) using argon, other inert gases are used, e.g. xenon, neon, krypton and/or radon. Also, instead of (or in addition to) using $SF_6$ other fluorine-containing gasses are used. Also, other gases may also be present in the RIE apparatus. Different types of RIE apparatus can be used. Further, different parameters (e.g. power densities, pressures, etc.) can be used. Accordingly, all such changes come within the invention.

I claim:

1. A method comprising:
    applying a mask layer to a workpiece, said mask layer comprising copper, said workpiece comprising $Al_2O_3$—TiC;
    patterning said mask layer, thereby exposing portions of said $Al_2O_3$—TiC; and
    reactive ion etching said exposed portions of said $Al_2O_3$—TiC with a process gas mixture, said gas mixture comprising an inert gas and a fluorine-containing gas to thereby form a substantially vertical wall, wherein said wall is at least 30 μm high.
2. Method of claim 1 wherein said wall is between 60 and 100 μm high.
3. Method of claim 1 wherein said process gas comprises a mixture of argon and $SF_6$.
4. Method of claim 3 wherein the ratio of argon to $SF_6$ is between 1:1 and 1:2.
5. Method of claim 1 wherein said patterning of said mask layer comprises applying photoresist to said mask layer, lithographically patterning said photoresist to thereby expose portions of said mask layer, and etching said mask layer.
6. Method of claim 5 further comprising:
    removing any remaining portions of said photoresist after patterning said mask layer; and
    removing any remaining portions of said mask layer after said reactive ion etching.
7. A method comprising:
    applying a mask layer to a workpiece, said mask layer comprising copper, said workpiece comprising $Al_2O_3$—TiC;
    patterning said mask layer, thereby exposing portions of said $Al_2O_3$—TiC; and
    reactive ion etching said exposed portions of said $Al_2O_3$—TiC with a process gas mixture, said gas mixture comprising an inert gas and a fluorine-containing gas to thereby form a wall having a steepness of 75 degrees or greater, wherein said wall is at least 30 μm high.

* * * * *